United States Patent [19]

Koyama et al.

[11] Patent Number: 5,041,307
[45] Date of Patent: Aug. 20, 1991

[54] PROCESS FOR PRODUCING MAGNETIC IRON OXIDE PARTICLES FOR MAGNETIC RECORDING

[75] Inventors: Arata Koyama, Moriyama; Makoto Ogasawara, Shiga; Shigeru Takatori, Moriyama, all of Japan

[73] Assignee: Ishihara Sangyo Kaisha, Ltd., Osaka, Japan

[21] Appl. No.: 442,223

[22] Filed: Nov. 28, 1989

[30] Foreign Application Priority Data

Dec. 1, 1988 [JP] Japan .................................. 63-305051
Mar. 28, 1989 [JP] Japan .................................. 1-075762

[51] Int. Cl.$^5$ ................................................ B05D 5/12
[52] U.S. Cl. ................................... 427/127; 252/62.56; 427/314; 427/331; 427/443.2
[58] Field of Search ............ 427/127, 314, 331, 443.2; 252/62.56

[56] References Cited

FOREIGN PATENT DOCUMENTS 53-87961 8/1978 Japan .
60-208805 10/1985 Japan .
61-4202 1/1986 Japan .

*Primary Examiner*—Bernard Pianalto
*Attorney, Agent, or Firm*—Cushman, Darby & Cushman

[57] ABSTRACT

A process for producing magnetic ion oxide particles for magnetic rcording which comprises heat-treating a magnetic iron oxide particles of magnetite, berthollide or maghemite as a starting materials, in the presence of a zinc component or both a zinc component and a silicon component at a temperature of 400° to 700° C. in a specific atmosphere, and if necessary, subjecting the heat-treated particles to wet treatment and/or dry treatment, thereby doping the particles with zinc ions resulting in magnetic iron oxide particles having an improved saturation magnetization, a proportion of said zinc ions being 2 to 9 at. % by weight relative to the total amount of iron ions.

24 Claims, No Drawings

PROCESS FOR PRODUCING MAGNETIC IRON OXIDE PARTICLES FOR MAGNETIC RECORDING

BACKGROUND OF THE INVENTION

1. Field of the Invention

The present invention relates to a process for producing magnetic iron oxide particles for use in magnetic recording and, more particularly, to a process for producing magnetic iron oxide particles suitable for a magnetic recording medium capable of effecting acoustic and image recording in a high density.

2. Description of the Related Art

Recently, there has been an increasing need to a magnetic recording medium having a higher performance such as magnetic tapes, magnetic disks and the like, associated with magnetic recording of sounds and images, miniaturization of reproducing instruments, an enhancement of quality and a great increase of a magnetic information processing capacity. That is, further enhancements of properties such as a high recording density, a high output and the like, have been increasingly demanded, which requires in turn magnetic particles used in the magnetic recording mediums to be much fine particles and to have a higher coercive force and a higher saturation magnetization characteristic.

Although making magnetic particles finer is one of the most effective methods for reducing noises, it causes inevitably a reduction of the saturation magnetization of the particles as well as reductions of a filling ratio and an orientability of the magnetic particles in a magnetic layer containing them dispersed as the sizes of the particles are reduced. Therefore, there is a great need to further enhance the magnetic properties of the magnetic particles such as saturation magnetization and remanent magnetization so that a higher recording density and a higher output can be imparted to the magnetic recording mediums. Various techniques have been proposed to improve the magnetic properties of the magnetic particles for use in the magnetic recording mediums. For example, there have been known a method for improving print-through as well as the saturation magnetization by heat-treating iron oxides to density the crystalline texture (for example, Japanese Patent KOKAI (Laid-Open) No. 58-199725), or a method for improving print-through as well as the saturation magnetization by modifying maghemite particles with a combination of ferrous compounds and zinc compounds and, if necessary, by further heat-treating the coated particles to avoid deterioration of the print-through and the saturation magnetization due to the coating-treatment when maghemite particles are modified with cobalt compounds for improvement of coercive force (for example, Japanese Patent KOKAI (Laid-Open) Nos. 53-87961, 60-208805, and 61-4202). In the former case, however, an attempt to obtain sufficient print-through tends to form $\alpha$-$Fe_2O_3$, to cause unavoidably reduction of the saturation magnetization, and in the latter case, the coercive force variers to a large extent with time though a certain degree of improvement of the coercive force and the saturation magnetization. Therefore, there have not been a few of difficulties to be improved yet.

SUMMARY OF THE INVENTION

An object of the present invention is to provide a process for producing magnetic iron oxide particles for magnetic recording comprising maghemite particles having a high saturation magnetization and stable magnetic properties.

Another object of the present invention is to provide a process for producing magnetic iron oxide particles for magnetic recording comprising berthollide particles having a high saturation magnetization and stable magnetic properties.

Still another object of the present invention is to provide a process for producing magnetic iron oxide particles for magnetic recording which comprises heat-treating magnetic iron oxide particles as a starting material, in the presence of a zinc component or a combination of a zinc component and a silicon component at a temperature of 400° to 700° C. in a non-reducing atmosphere, thereby doping said particles with zinc ions resulting in magnetic iron oxide particles having an improved saturation magnetization, a proportion of said zincs ion being 2 to 9 at. % by weight relative to the total amount of iron ions.

Still another object of the present invention is to provide a process for producing magnetic iron oxide particles for magnetic recording comprising steps of heat-treating a magnetic iron oxide particles, as a starting material, in the presence of a zinc component or a combination of a zinc component and a silicon component at a temperature of 400° to 700° C. in a non-reducing atmosphere and then immersing said particles in an acidic solution or an alkaline solution, thereby doping said particles with zinc ions resulting in magnetic iron oxide particles having an improved saturation magnetization, a proportion of said zinc ions being 2 to 9 at. % by weight relative to the total amount of iron ions.

Still another object of the present invention is to provide a process as described above where the starting material is magnetite particles or berthollide particles, the atmosphere is of oxidizing and the resulting magnetic iron oxide particles are zinc-doped maghemite particles.

Still another object of the present invention is to provide a process as described above where the starting material is maghemite particles, the atmosphere is of non-reducing and the resulting magnetic iron oxide particles are zinc-doped maghemite particles.

Still another object of the present invention is to provide a process as described above where the starting material is berthollide particles, the heat-treatment in the presence of the zinc component is performed in an inert atmosphere at a temperature of 450° to 600° C. and the resulting magnetic iron oxide particles are zinc-doped berthollide particles.

Still another object of the present invention is to provide a process as described above where the starting material is berthollide particles, the heat-treatment in the presence of the combination of a zinc component and a silicon component is performed in an inert atmosphere at a temperature of 450° to 700° C. and the resulting magnetic iron oxide particles are zinc-doped berthollide particles.

Still another object of the present invention is to provide a process as described above where the starting material bearing a zinc component, i.e., berthollide particles, are obtained by subjecting an aqueous dispersion of magnetite particles to a wet oxidation treatment with an oxygen containing gas and to a modification with a zinc compound.

Still another object of the present invention is to provide a process as described above where the starting material bearing both a zinc component and a silicon component, i.e., berthollide particles, are obtained by subjecting an aqueous dispersion of magnetite particles containing a silicon component to a wet oxidation treatment with an oxygen containing gas and to a modification with a zinc compound.

Still another object of the present invention is to provide a process as described above where the resulting magnetic particles having an improved saturation magnetization are modified with a cobalt compound or a combination of a cobalt compound and a ferrous compound.

Still another object of the present invention is to provide a process for producing iron oxide particles for magnetic recording comprising the steps of heat-treating a starting material, magnetite particles, in the presence of a zinc component or a combination of a zinc component and a silicon component at a temperature of 450° to 700° C., preferably 450° to 600° C., in an inert atmosphere and then treating by wet oxidation and/or dry oxidation, thereby doping said particles with zinc ions resulting in berthollide particles having an improved saturation magnetization, a proportion of said zinc ions being 2 to 9 at. % by weight relative to the total amount of iron ions.

Still another object of the present invention is to provide a process for producing iron oxide particles for magnetic recording comprising the steps of heat-treating a starting material, magnetite particles, in the presence of a zinc component or a combination of a zinc component and a silicon component at a temperature of 450° to 700° C., preferably 450° to 600° C., in an inert atmosphere, then treating by wet oxidation and/or dry oxidation and, thereafter, immersing said particles in an acidic solution or an alkaline solution, thereby said particles doped with zinc ions resulting in berthollide particles having an improved saturation magnetization, a proportion of said zinc ions being 2 to 9 at. % by weight relative to the total amount of iron ions.

Still another object of the present invention is to provide a process as described above where the resulting magnetic iron oxide particles having an improved saturation magnetization are modified with a cobalt compound or a combination of a cobalt and a ferrous compound.

DESCRIPTION OF PREFERRED EMBODIMENTS

The present inventors have made heretofore intensive researches on improvement of the performance of magnetic iron oxide particles, inter alia, acicular maghemite particles which are most abundantly used nowadays for the purpose of providing those which are useful to fulfill the demand for the higher recording density and output and the lower noise level of the magnetic recording mediums and have made an advancement in attempts to increase the saturation magnetization of the particles through modification with a minor amount of metallic ions. As a result, it has been found that the precursor particles capable of transforming to maghemite, or maghemite particles, may be heat-treated in the presence of a specific amount of a specific metallic ion under specific heating conditions to produce maghemite particles having a higher saturation magnetization due to the modification of their crystalline particles with the metallic ions and in addition a stable magnetic properties. It has been also found that such modified maghemite particles are insusceptible to deformation or sintering of particles and to substantial loss of the coercive force and that they have a good dispersibility to coating composition and an excellent squareness.

The present inventors have noticed and made a further research into the effects of ferrous ions on the modification of maghemite precursor particles or maghemite particles with zinc ions. As a result, the inventors have found that berthollide particles containing a specific amount of zinc ions may be heat-treated under specific heat-treating conditions, or magnetite particles containing a specific amount of zinc ions may be heat-treated under a specific heat-treating conditions, and then the heat-treated particles are subjected to oxidation treatment to modify the crystalline particles with the zinc ions and the ferrous ions, whereby the synergetic effects of the zinc ions and the ferrous ions allow production of berthollide ($FeO_x$, $1.33 < X < 1.5$: that is, an intermediate composition between magnetite and maghemite) having a much higher saturation magnetization and stable magnetic properties. In addition, it has been found that those berthollide particles are insusceptible to deformation or sintering of the particles and to a substantial loss of the coercive force and that they have a good dispersibility to coating composition and an excellent squareness.

Moreover, it has been found that those maghemite particles or berthollide particles having a higher saturation magnetization may be modified with a cobalt compound or both a cobalt compound and a ferrous compound to achieve much more desirable magnetic properties so that they are extremely suitable to high density magnetic tapes for recording sounds and images.

Thus, the present invention has been derived from the above findings. In the primary aspect of the present invention, there is provided a process for producing magnetic iron oxide particles for magnetic recording comprising either (a) heat-treating magnetite particles or berthollide particles containing a zinc component at a temperature of 400° to 700° C. in an oxidizing atmosphere, or (b) heat-treating maghemite particles containing a zinc component at a temperature of 400° to 700° C. in a non-reducing atmosphere, thereby doping said crystalline particles with 2 to 9 atomic % by weight of zinc ions as calculated as Zn/Fe to produce maghemite particles having an improved saturation magnetization.

In the second aspect of the present invention, there is provided a process for producing magnetic iron oxide particles for magnetic recording comprising either (a) heat-treating magnetite particles or berthollide particles containing a zinc component at a temperature of 400° to 700° C. in an oxidizing atmosphere, or (b) heat-treating maghemite particles containing a zinc component at a temperature of 400° to 700° C. in a non-reducing atmosphere, and then immersing said heat-treated particles in an acidic solution or an alkaline solution, thereby doping said crystalline particles with 2 to 9 at. % by weight of zinc ions as calculated as Zn/Fe to produce maghemite particles having an improved saturation magnetization.

In the third aspect of the present invention, there is provided a process for producing magnetic iron oxide particles for magnetic recording comprising (a) heat-treating berthollide particles containing a zinc component at a temperature of 450° to 600° C. in an inert atmosphere, or (b) heat-treating berthollide particles containing both a zinc component and a silicon component at a temperature of 450° to 700° C. in an inert atmosphere, or (c) heat-treating magnetite particles containing a zinc component at a temperature of 450° to 600° C. in an inert atmosphere and then subjecting the particles to wet oxidation and/or dry oxidation, or (d) heat-treating magnetite particles containing both a zinc component and a silicon component at a temperature of 450° to 700° C. in an inert atmosphere and then subjecting the particles to wet oxidation and/or dry oxidation, thereby doping said crystalline particles with 2 to 9 at. % by weight of zinc ions as calculated as Zn/Fe to produce berthollide particles having an improved saturation magnetization.

In the fourth aspect of the present invention, there is provided a process for producing magnetic iron oxide particles for magnetic recording comprising a step of (a) heat-treating berthollide particles containing a zinc component at a temperature of 450° to 600° C. in an inert atmosphere, or (b) heat-treating berthollide particles containing a combination of a zinc component and a silicon component at a temperature of 450° to 700° C. in an inert atmosphere, or (c) heat-treating magnetite particles containing a zinc component at a temperature of 450° to 600° C. in an inert atmosphere and then subjecting the particles to wet oxidation and/or dry oxidation, or (d) heat-treating magnetite particles containing both a zinc component and a silicon component at a temperature of 450° to 700° C. in an inert atmosphere and then subjecting the particles to wet oxidation and/or dry oxidation, and thereafter a step of immersing said heat-treated particles in an acidic solution or an alkaline solution, thereby doping said crystalline particles with 2 to 9 at. % zinc ions as calculated as Zn/Fe to produce berthollide particles having an improved saturation magnetization.

In the fifth aspect of the present invention, there is provided a process for producing magnetic iron oxide particles for magnetic recording as in the third and the fourth aspects, in which the berthollide particles containing a zinc component or both a zinc component and a silicon component are obtained by subjecting an aqueous dispersion of magnetite particles or magnetite particles containing a silicon component to a wet oxidation treatment with an oxygen containing gas and to a modification with a zinc compound.

In the sixth aspect of the present invention, there is provided a process for producing magnetic iron oxide particles for magnetic recording as in the first and the second aspects, in which the resulting maghemite particles having an improved saturation magnetization are modified with a cobalt compound or a combination of a cobalt compound and a ferrous compound.

In the seventh aspect of the present invention, there is provided a process for producing magnetic iron oxide particles for magnetic recording as in the third and the fourth aspects, in which the resulting berthollide particles having an improved saturation magnetization are modified with a cobalt compound or a combination of a cobalt compound and a ferrous compound.

The starting materials used in the present invention, i.e., magnetite, berthollide or maghemite particles containing a zinc component may be prepared by (a) adding a zinc compound to acicular hydrous iron oxide during formation thereof, modifying the acicular iron hydroxide with a zinc compound, or modifying the hematite obtained from the acicular hydrous iron oxide, for example, by thermal dehydration or hydrothermal treatment at a temperature of 300° to 750° C. with a zinc compound, and thereafter, reducing at a temperature of 300° to 500° C. to produce the magnetite particles containing a zinc component, or after the reduction, further oxidizing the particles to produce the berthollide particles or maghemite particles, or (b) modifying magnetite particles, berthollide particles or maghemite particles with a zinc compound, or (c) modifying maghemite particles with both a zinc compound and a ferrous compound, or effecting both the modification with a zinc compound and a partial reduction, or modified maghemite particles containing a zinc compound with a ferrous compound, or effecting a partial reduction to produce berthollide particles containing a zinc component.

In the aforementioned thermal dehydration of the hydrous iron oxide or the reduction of hematite, a heat resistance-affording agent such as phosphorus compounds, silicon compounds, aluminum compounds and the like, may be added to prevent sintering or deformation of particle shapes resulting preferably in further enhancement of the effects of the present invention. An amount of the heat resistance-affording agent to be added depends upon grain sizes of the hydrous iron oxide and hematite particles, and is 0.1 to 5 at. % by weight for each metallic element relative to the total amount of Fe in the basic particles. When a combination of two or more of the heat resistance-affording agents is used, the total amount of metallic elements to be added is 0.3 to 5 at. % by weight relative to the total amount of Fe in the basic particles. A lower amount of the agents than the above range can not achieve desirable effects, while a higher amount results unpreferably in a reduction in the saturation magnetization of the zinc doped maghemite and berthollide particles. Particularly, in the present invention, the addition of a silicon compound of 0.1 to 5 at. % by weight as Si/Fe as an heat resistance-affording agent allows the heat-treating temperature during the doping with zinc in an inert atmosphere to be higher, which is particularly preferred for an increase in the coercive force of the zinc-doped berthollide particles.

A variety of zinc compounds can be used as aforementioned zinc component including, for example, zinc chlorides, sulfates, nitrates and the like. The zinc component is added in such an amount as 2 to 9 at. % by weight, preferably 2.5 to 7 at. % by weight of zinc as Zn/Fe being present in the maghemite particles or berthollide particles doped with zinc ions, or in the particles after the treatment of immersing the zinc doped maghemite particles or berthollide particles in an acidic or an alkaline solution. A lower amount of the zinc component to be added than the above range can not achieve desirable effects, while a higher amount results in a reduction in the saturation magnetization of the particles. The inclusion of the zinc component may be achieved by adding a zinc compound to an aqueous dispersion of hydrous iron oxides or iron oxides, or to a wet cake to be treated and then drying the dispersion or the wet cake, or by adding a zinc compound and then an alkaline to the aqueous dispersion so as to precipitate zinc hydroxides on the treated particles. Particularly, in the cases of the steps (b) and (c) as described above, preferably while blowing an inert gas such as nitrogen gas into an aqueous dispersion to be treated, a zinc compound and an alkaline may be added in a non-oxidizing atmosphere to precipitate the zinc component as hydroxides on the treated particles. The partial oxidation treatment for production of the berthollide particles or the zinc containing berthollide particles by partially oxidizing the magnetite particles or the zinc containing magnetite particles in the cases of the steps (a) and (b) as described above may be conducted by heat-treatment generally at a temperature from room temperature to 250° C. in an atmosphere or oxygen containing gas, more commonly in air, or by wet heat-treatment while blowing an oxygen containing gas into an aqueous dispersion of the particles. The partial oxidation treatment enables the production of the desired berthollide or zinc-containing berthollide particles bearing ferrous ions by selecting appropriately a treating temperature, a treating time period, a partial pressure of oxygen in the oxygen containing gas, and an amount of the oxygen containing gas to be introduced. If necessary, a combination of the dry oxidation treatment and the wet oxidation treatment may be employed. The amount of ferrous ions in the berthollide particles after the partial oxidation treatment should be 30 at. % by weight or less as $Fe^{2+}$/total Fe. If the remaining amount of ferrous ions is higher than the above range, the thermal stability and the time-dependent stability of the saturation magnetization and the coercive force of the particles are degraded and also print-through thereof tends to be degraded.

Ferrous compounds used in the case of the step (c) as described above include ferrous chloride, sulfate, and nitrate. The ferrous compounds may be added in such an amount as 15 at. % by weight or less of ferrous ions as $Fe^{2+}$/total Fe being present in the zinc-doped berthollide particles, or the particles after the treatment of immersing the zinc-doped berthollide particles in an acidic solution or an alkaline solution. If the ferrous ions is present in a higher amount than the above range, unpreferably the resulting particles are apt to suffer from enlargement of their grains and to cause sintering during subsequent heat-treatments, so that the berthollide particles doped with zinc ions can not be expected to have an increased coercive force and tend to have a poor dispersibility at the time of production of paints with the particles as well as an poor orientation properties though the saturation magnetization of the particles is enhanced. The addition of the ferrous compounds may be conducted before, after or at the same time of the addition of zinc compounds to an aqueous dispersion of the particles to be treated and precipitated on the surface of the particles by adding an alkaline.

The partial reduction treatment in the case of the step (c) may be performed by heat-treatment in an inert atmosphere in the presence of an organic compound such as oleic acid, stearic acid and the like as well as heat-treatment in a reducing atmosphere such as hydrogen gas. Alternatively, it may be performed by adding a reducing agent such as sodium borohydride, hydrazine chloride or the like to an aqueous dispersion of the particles to be treated. The amount of ferrous ions in the berthollide particles or the zinc containing berthollide particles after the partial reduction should be 30 at. % by weight or less as $Fe^{2+}$/total Fe. If the remaining amount of ferrous ions is higher than the above range, the thermal stability and the time-dependent stability of the saturation magnetization and the coercive force, and print-through of the zinc-doped berthollide particles are undesirably degraded.

The heat-treatment for converting the magnetite, berthollide, or maghemite particles containing a zinc component prepared as described above into the maghemite doped with zinc may be performed by [I] heating the magnetite or berthollide particles containing a zinc component in an oxidizing atmosphere, for example, an atmosphere of oxygen containing gas, most commonly in air, at a temperature of 400° to 700° C., preferably 450° to 650° C., generally for about 0.5 to 5 hours, or [II] heating the maghemite particles containing a zinc component in a non-reducing atmosphere, generally in an atmosphere of nitrogen, argon, helium, carbon dioxide, air or the like at a temperature of 400° to 700° C., preferably 450° to 650° C., generally for about 0.5 to 5 hours. A lower temperature than the above range is unable to impart a desirably increased saturation magnetization to the particles, while a higher temperature tends to cause sintering of the particles and transition into non-magnetic $\alpha$-$Fe_2O_3$, unpreferably resulting in an reduction in the saturation magnetization of the particles.

The maghemite containing a zinc component obtained by oxidizing the magnetite or berthollide particles containing a zinc component at a temperature of 400° C. or less may be subjected to the heat-treatment as in the step [II] described above.

X-ray diffraction analysis indicated that the maghemite particles doped with zinc ions in accordance with the process of the present invention exhibited a shifting 0.3% or less in the lattice constant obtained from the diffraction angles of (311) plane for the maghemite particles, and an acidic melting method for detecting a distribution of zinc ions in the particles showed that the zinc ions were diffused in the particles and that they were zinc doped maghemite.

The term "maghemite" refers to iron oxides consisting substantially of $\gamma$-$Fe_2O_3$ including those containing only a few ferrous ions.

The process for producing the zinc-doped berthollide particles by heating the berthollide or magnetite particles containing a zinc component prepared as described above comprises [III] heating the zinc-containing berthollide particles in an inert atmosphere of, for example, nitrogen, argon, helium, carbon dioxide, most commonly in a nitrogen atmosphere at a temperature of 450° to 600° C., or in the case of inclusion of a silicon component as a heat resistance-affording agent at a temperature of 450° to 700° C., generally for 0.5 to 5 hours. A lower heating temperature than the above range induces insufficient diffusion of zinc ions and ferrous ions inside the particles failing in achieving an desired enhancement of the saturation magnetization and coercive force of the particles, while a higher temperature than the above range, unpreferably the resulting particles are apt to cause sintering of the particles so that the particles tend to have a poor dispersibility for production of paints therewith as well as an poor orientation properties though the saturation magnetization and the coercive force of the particles are enhanced. [IV] In the case of magnetite particles containing a zinc component, moreover, partially oxidizing the magnetite particles is followed by the aforementioned heat treatment in an inert atmosphere to produce desired zinc-doped berthollide particles containing ferrous ions. The partial oxidation may be conducted by heating at a temperature from room temperature to 250° C. in an atmosphere of oxygen containing gas, most commonly in air, or by wet heat-treatment while blowing an oxygen containing gas into an aqueous dispersion of the particles. The partial oxidation treatment enables the production of the desired berthollide particles containing ferrous ions by selecting appropriately a treating temperature, a treating time period, a partial pressure of oxygen in the oxygen containing gas, and an amount of the oxygen containing gas to be introduced. If necessary, a combination of the dry oxidation treatment and the wet oxidation treatment may be employed as the partial oxidation treatment. The wet oxidation treatment may be conducted concurrently with an immersing treatment in an acidic solution or an alkaline solution as described hereinafter. The amount of ferrous ions in the zinc-doped berthollide particles after the partial oxidation treatment should be 30 at. % by weight or less as $Fe^{2+}$/total Fe. If the remaining amount of ferrous ions is higher than the above range, the thermal stability and the time-dependent stability of the saturation magnetization and the coercive force of the berthollide particles are lowered and also print-through thereof degraded.

The acidic melting method for detecting a distribution of ions inside the particles revealed that the zinc ions ad the ferrous ions were diffused within the particles indicating that the particles were zinc doped berthollide.

The magnetic iron oxide particles in accordance with the present invention may be further immersed in an acidic solution (e.g., an aqueous solution of sulfuric acid, acetic acid, or the like) or an alkaline solution (e.g., an aqueous solution of alkali hydroxides, ammonia, or the like) to remove non-magnetic components such as unreacted zinc oxide and the like, or subjected to surface modification in order to achieve less fluctuation of quality, an additional increase in saturation magnetization, and a more enhanced coercive force exhibited by cobalt-containing magnetic iron oxide particles which are produced with the above iron oxide particles.

The zinc-doped maghemite and the zinc-doped berthollide particles may be modified with a cobalt compound or both a cobalt compound and a ferrous compound on the surface of the particles to make their coercive force and even saturation magnetization more preferable. Many known methods for performing the modification can be employed. For example, zinc-doped maghemite or the zinc-doped berthollide particles as substrates may be dispersed in an alkaline solution to produce an aqueous alkaline dispersion in which the cobalt compound or both the cobalt and the ferrous compounds are reacted. The methods can be carried out by selecting appropriately the way of addition, treating temperature, concentration of alkali, and atmosphere. The substrate particles are modified with such compounds to provide 0.5 to 10 at. % by weight, preferably 1 to 8 at. % by weight Co, and 0 to 25 at. % by weight, preferably 0 to 18 at. % by weight $Fe^{2+}$ relative to the total of Fe.

In the present invention, metallic ions such as, for example, (1) manganese impurity in the ferrous sulfate as source for goethite, (2) calcium, magnesium and tin to be added as shape controlling agents to goethite, and (3) nickel and calcium to be added to impart thermal stability to maghemite may be coexistent without diminishing the effects of the present invention.

The present invention will be further illustrated with reference to the following examples and comparative examples.

EXAMPLE 1

After 100 g of maghemite ($\gamma$-$Fe_2O_3$) having a coercive force Hc of 330 (Oe), a saturation magnetization $\sigma$s of 71.0 (emu/g) and a specific surface area of 48 ($m^2$/g) were dispersed in 2 liters of water, 32.1 ml of a 1 mol/l aqueous solution of zinc sulfate were added with stirring to the dispersion and the temperature of the resulting mixture was raised to 60° C. Then, a 1.0 N aqueous solution of sodium hydroxide was gradually added to the mixture to control pH at 8, maintained for 2 hours, then filtered, washed with water and dried. The dried material was heated in a muffle furnace at a temperature of 500° C. in air for 1 hour to produce end magnetic iron oxide particles (sample A).

EXAMPLE 2

Example 1 was repeated, except that 32.1 ml of the 1 mol/l aqueous solution of zinc sulfate was replaced by 53.5 ml thereof, to produce end magnetic iron oxide particles (sample B).

EXAMPLE 3

Example 1 was repeated, except that 32.1 ml of the 1 mol/l aqueous solution of zinc sulfate was replaced by 74.9 ml thereof, to produce end magnetic iron oxide particles (sample C).

EXAMPLE 4

After 100 g of sample C. was dispersed in 2 liters of a diluted aqueous solution of sulfuric acid at pH of 2, the dispersion was warmed with stirring to a temperature of 40° C., maintained at this temperature for 3 hours, then filtered, washed with water, and dried to dissolve and remove unreacted zinc compound, thereby producing end magnetic iron oxide particles (sample D).

COMPARATIVE EXAMPLE 1

Example 1 was repeated, except that 32.1 ml of the 1 mol/l aqueous solution of zinc sulfate was replaced by 10.7 ml thereof, to produce control magnetic iron oxide particles (sample A').

COMPARATIVE EXAMPLE 2

Example 1 was repeated, except that 32.1 ml of the 1 mol/l aqueous solution of zinc sulfate was replaced by 128.4 ml thereof, to produce $\gamma$-$Fe_2O_3$ particles modified with zinc ions. After 100 g of the resultant magnetic particles was dispersed in 2 liters of a diluted aqueous solution of sulfuric acid at pH of 2, the dispersion was warmed with stirring to a temperature of 40° C., maintained at this temperature for 3 hours, then filtered, washed with water, and dried to produce control magnetic iron oxide particles (sample B').

COMPARATIVE EXAMPLE 3

The starting material, $\gamma Fe_2O_3$ particles used in Example 1 was heated in a muffle furnace at 500° C. in air for one hour to produce simply heat-treated $\gamma$-$Fe_2O_3$ particles (sample C').

EXAMPLE 5

Example 2 was repeated, except that the temperature of 500° C. for the heat-treatment in air was replaced by that of 450° C., to produce end magnetic iron oxide particles (sample E).

EXAMPLE 6

Example 2 was repeated, except that the temperature of 500° C. for the heat-treatment in air was replaced by that of 650° C., to produce end magnetic iron oxide particles (sample F).

COMPARATIVE EXAMPLE 4

Example 2 was repeated, except that the temperature of 500° C. for the heat-treatment in air was replaced by that of 300° C., to produce control magnetic iron oxide particles (sample D').

COMPARATIVE EXAMPLE 5

Example 2 was repeated, except that the temperature of 500° C. for the heat-treatment in air was replaced by that of 750° C., to produce control magnetic iron oxide particles (sample E').

EXAMPLE 7

After 100 g of α-FeOOH having an average longitudinal length of 0.2 μm, an aspect ratio of 12 and a specific surface area of 90 m²/g were dispersed in 2 liters of water, 48.1 ml of a 1 mol/l aqueous solution of zinc sulfate and 12.9 ml of a 1 mol/l aqueous solution of orthophosphoric acid were added with stirring to the dispersion and the temperature of the resulting mixture was raised to 60° C. Then, 14.2 ml of a 1 mol/l sodium orthosilicate were added and, moreover, a 1 N aqueous solution of sodium hydroxide was gradually added to the mixture to control pH at 7.5, maintained for 2 hours, then filtered, washed with water and dried. The dried material was heated to a temperature of 600° C. for 2 hours to dehydrate and then subjected to reduction at 400° C. for 2 hours under a flow of a hydrogen gas containing moisture to produce zinc-containing magnetite particles which were heated in a muffle furnace at 500° C. in air for one hour to obtain end magnetic iron oxide particles (sample G).

COMPARATIVE EXAMPLE 6

Example 7 was repeated, except that the zinc-containing magnetite particles were heated in the muffle furnace at 300° C. in air for one hour, to produce a control sample (sample F').

COMPARATIVE EXAMPLE 7

Example 7 was repeated, except that the aqueous solution of zinc sulfate was not added, to produce a control sample (sample G').

EXAMPLE 8

After 100 g of α-Fe₂O₃ having an average longitudinal length of 0.2 μm, an aspect ratio of 11 and a specific surface area of 50 m²/g were dispersed in 2 liters of water, 53.5 ml of a 1 mol/l aqueous solution of zinc sulfate were added with stirring to the dispersion and the temperature of the resulting mixture was raised to 60° C. Then a 1 N aqueous solution of sodium hydroxide was gradually added to the mixture to control pH at 8, maintained for 2 hours, then filtered, washed with water and dried. The dried material was subjected to reduction at 400° C. for 2 hours under a flow of a hydrogen gas containing moisture to produce zinc-containing magnetite particles which were heated in a muffle furnace at 500° C. in air for one hour to obtain end magnetic iron oxide particles (sample H).

EXAMPLE 9

To 20 liters of a 1 mol/l aqueous solution of ferrous sulfate was added 410 ml of a 1 mol/l aqueous solution of zinc sulfate and the resultant mixture was warmed with stirring to 50° C. while flowing nitrogen gas thereinto. After adding 1 liter of a 10 N aqueous solution of sodium hydroxide the mixture was oxidized for 58 minutes while blowing air at a rate of 2 liters/min instead of nitrogen gas. Then, the precipitate was filtered and washed with water to produce α-FeOOH particles containing 4.8% by weight Zn calculated as Zn/Fe and having an average longitudinal length of 0.25 μm, an aspect ratio of 18 and a specific surface area of 95 m²/g. To 2 liters of a slurry containing 100 g of this α-FeOOH, was added 12.9 ml of a 1 mol/l aqueous solution of orthophosphoric acid and the resulting mixture was warmed with stirring at 40° C. Then, a 1 N aqueous solution of sodium hydroxide was gradually added to the mixture to control pH at 5, maintained for 2 hours, then filtered, washed with water and dried to produce zinc-containing α-FeOOH particles coated with 0.57% by weight phosphorus (calculated as P/F) as a heat resistance-affording agent.

This α-FeOOH particles were heated at a temperature of 600° C. to dehydrate and reduced at 400° C. for 2 hours under a flow of a hydrogen gas containing moisture to produce zinc-containing magnetite particles which were heated in a muffle furnace at 500° C. in air for one hour to obtain end magnetic iron oxide particles (sample I).

COMPARATIVE EXAMPLE 8

Example 9 was repeated, except that the zinc-containing magnetite particles were heated in the muffle furnace at 300° C. in air for one hour, to produce a control sample (sample H').

COMPARATIVE EXAMPLE 9

The zinc-containing magnetite particles produced in Example 9 were heated at a temperature of 500° C. in a nitrogen atmosphere for one hour and, thereafter, heated in the muffle furnace at 300° C. in air for one hour, to produce a control sample (sample I').

EXAMPLE 10

After 100 g of magnetite particles having a coercive force Hc of 330 (Oe), a saturation magnetization σs of 79.6 (emu/g) and a specific surface area of 48 (m²/g) were dispersed in 2 liters of water, the dispersion was warmed with stirring at 50° C. while blowing nitrogen gas, and then subjected to wet oxidation by maintaining for 3 hours with the nitrogen gas to be blown being exchanged with air (1 liter/min.). Thereafter, again the air to be blown was exchanged with nitrogen gas and 60.9 ml of a 1 mol/liter aqueous solution of zinc sulfate was added with stirring to the dispersion. Then, a 1 N aqueous solution of sodium hydroxide was gradually added to the dispersion to control pH at 8, maintained for 2 hours, then filtered, washed with water and dried at 120° C. for 5 hours in a nitrogen gas atmosphere to produce berthollide particles containing the zinc component. The resulting particles were heated in a tubular furnace at a temperature of 550° C. in a nitrogen atmosphere for one hour to produce end magnetic iron oxide particles (sample J).

EXAMPLE 11

Example 10 was repeated, except that the wet oxidation was carried out for 3 hours, to produce end magnetic iron oxide particles (sample K).

EXAMPLE 12

Example 10 was repeated, except that the heating treatment in the tubular furnace in the nitrogen atmosphere was carried out at a temperature of 500° C. for one hour, to produce end magnetic iron oxide particles (sample L).

EXAMPLE 13

After 100 g maghemite ($\gamma$-$Fe_2O_3$) particles having a coercive force Hc of 330 (Oe), a saturation magnetization $\sigma$s of 71.0 (emu/g) and a specific surface area of 48 ($m^2$/g) was dispersed in 2 liters of water, the dispersion was warmed with stirring at 60° C. while blowing nitrogen gas thereinto, 58.9 ml of a 1 mol/l aqueous solution of zinc sulfate and 125 ml of a 1 mol/l aqueous solution of ferrous sulfate were added with stirring to the dispersion. Thereafter, a 1.0 N aqueous solution of sodium hydroxide was gradually added to the dispersion to control pH at 8, maintained for 2 hours, then filtered, washed with water and dried at 120° C. for hours in a nitrogen gas atmosphere to produce berthollide particles containing the zinc component. The resulting particles were heated in a tubular furnace at a temperature of 500° C. in a nitrogen atmosphere for one hour to produce end magnetic iron oxide particles (sample M).

EXAMPLE 14

After 100 g of $\alpha$-FeOOH having an average longitudinal length of 0.20 μm, an aspect ratio of 12 and a specific surface area of 90 $m^2$/g was dispersed in 2 liters of water, 52.9 ml of a 1 mol/l aqueous solution of zinc sulfate and 27.0 ml of a 1 mol/l aqueous solution of sodium orthosilicate as a agglomeration preventive agent were added and the resulting mixture was warmed at a temperature of 60° C. Thereafter, a 1 N aqueous solution of sodium hydroxide was gradually added to the mixture to control pH at 7, maintained for 2 hours, then filtered, washed with water and dried. The dried material was heated at a temperature of 600° C. for 2 hours to dehydrate and then reduced at 420° C. for 2 hours under a flow of a hydrogen gas containing moisture to produce zinc-containing magnetite particles which were heated in a tubular furnace at 650° C. in a nitrogen atmosphere for one hour to obtain zinc-doped magnetite particles.

100 g of the zinc-doped magnetite particles was dispersed in 2 liters of water, the dispersion was warmed with stirring at 60° C. while blowing air thereinto, and then subjected to wet oxidation by maintaining for 3 hours. The resultant material was filtered, washed with water and dried at 120° C. for 5 hours in a nitrogen gas atmosphere to produce end magnetic iron oxide particles (sample N, Si/Total Fe: 1.2 at. % by weight).

COMPARATIVE EXAMPLE 10

Example 10 was repeated, except that the heating treatment in the tubular furnace in the nitrogen gas atmosphere was carried out at a temperature of 300° C. for one hour, to produce a control sample (sample J').

COMPARATIVE EXAMPLE 11

Example 10 was repeated, except that the heating treatment in the tubular furnace in the nitrogen gas atmosphere was carried out at a temperature of 700° C. for one hour, to produce a control sample (sample K').

COMPARATIVE EXAMPLE 12

Example 13 was repeated, except that the heating treatment in the tubular furnace in the nitrogen gas atmosphere was not employed, to produce a control sample (sample L').

COMPARATIVE EXAMPLE 13

After 100 g of acicular magnetite particles used in Example 10 was dispersed in 2 liters of water, the dispersion was warmed with stirring at 50° C. while blowing nitrogen gas thereinto, and then subjected to wet oxidation by maintaining for 3 hours with the nitrogen gas to be blown being exchanged with air (1 liter/min.). Then, the dispersion was filtered, washed with water and dried at 120° C. for 5 hours in a nitrogen gas atmosphere to produce berthollide particles. The resulting particles were heated in the tubular furnace at a temperature of 550° C. in a nitrogen gas atmosphere for one hour to produce a control sample (sample M').

COMPARATIVE EXAMPLE 14

Example 14 was repeated, except that the aqueous solution of sodium orthosilicate as a heat resistance-affording agent was replaced by 24.3 ml of a 1 mol/l aqueous solution of orthophosphoric acid, to produce a control sample (sample N', P/total Fe: 1.2 at. % by weight).

EXAMPLE 15

After 100 g of the magnetic iron oxide particles, sample B, produced in Example 2 was dispersed in 2 liters of water, 250 ml of a 10 N aqueous solution of sodium hydroxide was added to the dispersion and the resulting mixture was warmed with stirring at a temperature of 60° C. while blowing nitrogen gas thereinto. Thereafter, 150 ml of a 1 mol/l aqueous solution of ferrous sulfate and further 71 ml of a 1 mol/l aqueous solution of cobalt sulfate were added to the mixture which was aged for 5 hours. The resultant precipitate was filtered, washed with water and dried at 120° C. for 5 hours in a nitrogen gas atmosphere to produce end magnetic iron oxide particles containing cobalt (sample O).

EXAMPLE 16

The magnetic iron oxide particles, sample G, produced in Example 7 were treated in the same manner as in Example 15 to produce end magnetic iron oxide particles containing cobalt (sample P).

EXAMPLE 17

The magnetic iron oxide particles, sample C, produced in Example 3 were treated in the same manner as in Example 15 to produce end magnetic iron oxide particles containing cobalt (sample Q).

EXAMPLE 18

100 g of the magnetic iron oxide particles, sample C., produced in Example 3 were dispersed in 2 liters of a 1 mol/l aqueous solution of sodium hydroxide. The dispersion was warmed with stirring at a temperature of 40° C., maintained for 3 hours, then filtered, washed with water and dried. Thereafter, the surfaces of the resulting particles were modified and treated in the same manner as in Example 15 to produce end magnetic iron oxide particles containing cobalt (sample R).

COMPARATIVE EXAMPLE 15

The magnetic iron oxide particles, sample C', produced in Comparative Example 3 were treated in the same manner as in Example 15 to produce control magnetic iron oxide particles containing cobalt (sample O').

EXAMPLE 19

After 50 g of the magnetic iron oxide particles, sample J, produced in Example 10 were dispersed in one liters of water, 125 ml of a 10 N aqueous solution of sodium hydroxide was added to the dispersion and then the resulting mixture was warmed with stirring at a temperature of 60° C. while blowing nitrogen gas thereinto. Thereafter, 88 ml of a 1 mol/l aqueous solution of ferrous sulfate and further 41 ml of a 1 mol/l aqueous solution of cobalt sulfate were added to the mixture which was aged for 5 hours. The resultant precipitate was filtered, washed with water and dried at 120° C. for 5 hours in a nitrogen gas atmosphere to produce end magnetic iron oxide particles containing cobalt (sample S).

EXAMPLE 20

After 100 g of the magnetic iron oxide particles, sample K, produced in Example 11 were dispersed in 2 liters of an acidic aqueous solution containing 10.5 ml of a 1.0 mol/l aqueous solution of sulfuric acid, the resulting dispersion was warmed with stirring at a temperature of 60° C. while blowing nitrogen gas thereinto and maintained for 5 hours to modify the surfaces of the particles resulting in zinc-doped berthollide particles having a modified surface.

After 50 g of the zinc-doped berthollide particles having a modified surface were dispersed in one liters of water and 110 ml of a 10 N aqueous solution of sodium hydroxide was added to the dispersion, the resulting mixture was warmed with stirring at a temperature of 60° C. while blowing nitrogen gas thereinto. Thereafter, 41 ml of a 1 mol/l aqueous solution of cobalt sulfate was added to the mixture which was aged for 5 hours. The resultant precipitate was filtered, washed with water and dried at 120° C. for 5 hours in a nitrogen gas atmosphere to produce end magnetic iron oxide particles containing cobalt (sample T).

COMPARATIVE EXAMPLE 16

The control sample J' produced in Comparative Example 10 was treated in the same manner as in Example 20 to produce control magnetic iron oxide particles containing cobalt (sample P').

COMPARATIVE EXAMPLE 17

The control sample M' produced in Comparative Example 13 was treated in the same manner as in Example 20 to produce control magnetic iron oxide particles containing cobalt (sample Q').

The samples A to T and A' to Q' of Examples and Comparative Examples were measured for the coercive force (Hc: Oe), the saturation magnetization ($\sigma s$: emu/g). Moreover, the measurement of the specific surface area (BET: $m^2/g$) and the chemical analysis (at. % by weight based on the total Fe) were conducted. The results are shown in Table 1.

The samples B, C', O, P, O', S, T, P', and Q' were employed to prepare magnetic paints with a composition as shown below. The paints were coated on polyester films, subjected to orientation and then dried to prepare magnetic tapes (dried film thickness: 10 $\mu$). The resulting tapes were measured by conventional methods for the coercive force (Hc), remanence (Br), saturation (Bm), squareness (Br/Bm), orientation (OR) and switching field distribution (SFD). Those results are shown in Table 2.

| Magnetic paint composition: | | |
|---|---|---|
| (1) | magnetic particles | 100 parts by weight |
| (2) | dispersant | 3.23 parts by weight |
| (3) | vinyl chloride-vinyl acetate copolymer resin | 10.5 parts by weight |
| (4) | methyl ethyl ketone | 83 parts by weight |
| (5) | toluene | 90 parts by weight |

The present invention allows the production of maghemite, berthollide, or cobalt modified maghemite and berthollide particles having a higher saturation magnetization and a stable magnetic properties by a commercially very easily practicable process. The resultant magnetic particles are highly useful for the high density magnetic recording medium.

TABLE 1

| Example No. | Sample | Zinc content Zn/Fe (at. % by weight) | Heat-treatment conditions Atmosphere | Heat-treatment conditions Temperature (°C.) | $\frac{Fe^{2+}}{T.Fe}$ (at. % by weight) | Specific surface area ($m^2/g$) | Magnetic properties of particles Hc (Oe) | Magnetic properties of particles $\sigma s$ (emu/g) | Rs |
|---|---|---|---|---|---|---|---|---|---|
| Example 1 | A | 3.0 | air | 500 | — | — | 323 | 73.0 | 0.421 |
| Example 2 | B | 5.0 | " | " | — | — | 323 | 75.6 | 0.418 |
| Example 3 | C | 7.0 | " | " | — | — | 320 | 72.5 | 0.418 |
| Example 4 | D | 5.7 | — | — | — | — | 318 | 74.0 | 0.418 |
| Comparative Example 1 | A' | 1.0 | air | 500 | — | — | 325 | 71.2 | 0.422 |
| Comparative Example 2 | B' | 10.1 | " | " | — | — | 310 | 65.8 | 0.415 |
| Comparative Example 3 | C' | — | " | " | — | — | 325 | 71.3 | 0.422 |
| Example 5 | E | 5.0 | " | 450 | — | — | 323 | 74.7 | 0.418 |
| Example 6 | F | " | " | 650 | — | — | 320 | 76.3 | 0.418 |
| Comparative Example 4 | D' | " | " | 300 | — | — | 325 | 67.5 | 0.422 |
| Comparative Example 5 | E' | " | " | 750 | — | — | 303 | 48.0 | 0.408 |
| Example 7 | G | 4.9 | air | 500 | — | — | 328 | 75.0 | 0.422 |
| Comparative Example 6 | F' | " | " | 300 | — | — | 325 | 68.0 | 0.420 |
| Comparative Example 7 | G' | — | " | 500 | — | — | 330 | 70.5 | 0.423 |
| Example 8 | H | 5.1 | " | " | — | — | 325 | 75.1 | 0.420 |
| Example 9 | I | 4.8 | " | " | — | — | 360 | 73.8 | 0.452 |
| Comparative | H' | 4.8 | air | 300 | — | — | 365 | 66.2 | 0.454 |

TABLE 1-continued

| Example No. | Sample | Zinc content Zn/Fe (at. % by weight) | Heat-treatment conditions Atmosphere | Temperature (°C.) | $\frac{Fe^{2+}}{T.Fe}$ (at. % by weight) | Specific surface area (m²/g) | Magnetic properties of particles Hc (Oe) | σs (emu/g) | Rs |
|---|---|---|---|---|---|---|---|---|---|
| Example 8 Comparative | I' | " | nitrogen | 500 | — | — | 362 | 66.3 | 0.453 |
| Example 9 | | | air | 300 | | | | | |
| Example 10 | J | 5.5 | nitrogen | 550 | 24 | 42 | 370 | 86.0 | 0.413 |
| Example 11 | K | " | " | " | 22 | 42 | 360 | 85.2 | 0.412 |
| Example 12 | L | " | " | 500 | 21 | 45 | 340 | 84.2 | 0.406 |
| Example 13 | M | 5.0 | " | " | 8 | 40 | 280 | 81.0 | 0.403 |
| Example 14 | N | 5.5 | " | 650 | 25 | 30 | 380 | 86.5 | 0.418 |
| Comparative Example 10 | J' | 5.5 | " | 300 | 24 | 47 | 300 | 76.1 | 0.402 |
| Comparative Example 11 | K' | 5.5 | nitrogen | 700 | 24 | 25 | 180 | 90.0 | 0.380 |
| Comparative Example 12 | L' | 5.0 | — | — | 8 | 46 | 270 | 71.5 | 0.401 |
| Comparative Example 13 | M' | — | nitrogen | 550 | 24 | 43 | 360 | 77.7 | 0.420 |
| Comparative Example 14 | N' | 5.5 | " | 650 | 25 | 32 | 300 | 86.6 | 0.391 |
| Example 15 | O | | Substrate particles coated with cobalt (B) | | — | — | 715 | 82.0 | 0.474 |
| Example 16 | P | | Substrate particles coated with cobalt (G) | | — | — | 703 | 81.3 | 0.475 |
| Example 17 | Q | | Substrate particles coated with cobalt (C) | | — | — | 670 | 79.0 | 0.471 |
| Example 18 | R | | Substrate particles coated with cobalt (C) | | — | — | 730 | 81.8 | 0.476 |
| Comparative Example 15 | O' | | Substrate particles coated with cobalt (C') | | — | — | 728 | 77.0 | 0.476 |
| Example 19 | S | | Substrate particles coated with cobalt (J) | | 25 | 37 | 710 | 87.5 | 0.442 |
| Example 20 | T | | Substrate particles coated with cobalt (K) | | 18 | 40 | 660 | 83.5 | 0.459 |
| Comparative Example 16 | P' | | Substrate particles coated with cobalt (J') | | 23 | 38 | 598 | 80.1 | 0.431 |
| Comparative Example 17 | Q' | | Substrate particles coated with cobalt (M') | | 22 | 39 | 718 | 79.6 | 0.451 |

TABLE 2

| Example No. | Sample | Magnetic properties of tape Hc (Oe) | Br (GAUSS) | Bm (GAUSS) | SQ | OR | SFD |
|---|---|---|---|---|---|---|---|
| Example 2 | B | 315 | 1320 | 1680 | 0.784 | 2.17 | 0.52 |
| Comparative Example 3 | C' | 323 | 1160 | 1530 | 0.760 | 2.08 | 0.54 |
| Example 15 | O | 768 | 1850 | 2310 | 0.802 | 2.00 | 0.43 |
| Example 16 | P | 770 | 1850 | 2250 | 0.822 | 2.23 | 0.44 |
| Comparative Example 15 | O' | 790 | 1560 | 2030 | 0.768 | 1.78 | 0.44 |
| Example 19 | S | 772 | 1900 | 2410 | 0.789 | 1.95 | 0.56 |
| Example 20 | T | 689 | 1880 | 2320 | 0.809 | 1.89 | 0.48 |
| Comparative Example 16 | P' | 649 | 1630 | 2150 | 0.760 | 1.76 | 0.60 |
| Comparative Example 17 | Q' | 790 | 1590 | 2070 | 0.770 | 1.81 | 0.55 |

What is claimed is:

1. A process for producing magnetic iron oxide particles for magnetic recording, which comprise heat-treating magnetic iron oxide particles as a starting material, in the presence of a zinc component or both a zinc component and a silicon component at a temperature of 400° to 700° C. in a non-reducing atmosphere, thereby doping said particles with zinc ions resulting in magnetic iron oxide particles having an improved saturation magnetization, a proportion of said zinc improved saturation magnetization, a proportion of said zinc ions being 2 to 9 at. % by weight relative to the total amount of iron ions.

2. The process according to claim 1 where said starting material is magnetite particles or berthollide particles, the atmosphere is of oxidizing and the resulting magnetic iron oxide particles are zinc-doped maghemite particles.

3. The process according to claim 1 where said starting material is maghemite particles, the atmosphere is of non-reducing and the resulting magnetic iron oxide particles are zinc-doped maghemite particles.

4. The process according to claim 1 where said starting material is berthollide particles, the heat-treatment in the presence of the zinc component is performed in an inert atmosphere at a temperature of 450° to 600° C. and the resulting magnetic iron oxide particles are zinc-doped berthollide particles.

5. The process according to claim 4 where said starting material bearing a zinc component, berthollide particles, are obtained by subjecting an aqueous dispersion of magnetite particles to a wet oxidation treatment with an oxygen containing gas and to a modification with a zinc compound.

6. The process according to claim 1 where said starting material is berthollide particles, the heat-treatment in the presence of both a zinc component and a silicon component is performed in an inert atmosphere at a temperature of 450° to 700° C. and the resulting magnetic iron oxide particles are zinc-doped berthollide particles.

7. The process according to claim 6 where said starting material bearing both a zinc component and a silicon component, berthollide particles, are obtained by subjecting an aqueous dispersion of magnetite particles containing a silicon component to a wet oxidation treatment with an oxygen containing gas and to a modification with a zinc compound.

8. A process for producing magnetic iron oxide particles for magnetic recording comprising modifying the magnetic iron oxide particles having an improved saturation magnetization obtained in accordance with claim 1 with a cobalt compound or both a cobalt compound and a ferrous compound.

9. A process for producing magnetic iron oxide particles for magnetic recording comprising the steps of heat-treating a starting material, magnetic iron oxide particles, in the presence of a zinc component or both a zinc component and a silicon component at a temperature of 400° to 700° C. in a non-reducing atmosphere and then immersing said particles in an acidic solution or an alkaline solution, thereby doping said particles with zinc ions resulting in magnetic iron oxide particles having an improved saturation magnetization, a proportion of said zinc ions being 2 to 9 at. % by weight relative to the total amount of iron ions.

10. The process according to claim 9 where said starting material is magnetite particles or berthollide particles, the atmosphere is of oxidizing and the resulting magnetic iron oxide particles are zinc-doped maghemite particles.

11. The process according to claim 9 where said starting material is maghemite particles, the atmosphere is of non-reducing and the resulting magnetic iron oxide particles are zinc-doped maghemite particles.

12. The process according to claim 9 where said starting material is berthollide particles, the heat-treatment in the presence of the zinc component is performed in an inert atmosphere at a temperature of 450° to 600° C. and the resulting magnetic iron oxide particles are zinc-doped berthollide particles.

13. The process according to claim 12 where said starting material bearing a zinc component, berthollide particles, are obtained by subjecting an aqueous dispersion of magnetite particles to a wet oxidation treatment with an oxygen containing gas and to a coating treatment with a zinc compound.

14. The process according to claim 9 where said starting material is berthollide particles, the heat-treatment in the presence of both a zinc component and a silicon component is performed in an inert atmosphere at a temperature of 450° to 700° C. and the resulting magnetic iron oxide particles are zinc-doped berthollide particles.

15. The process according to claim 14 where said starting material bearing both a zinc component and a silicon component berthollide particles, are obtained by subjecting an aqueous dispersion of magnetite particles containing a silicon component to a wet oxidation treatment with an oxygen containing gas and to a modification with a zinc compound.

16. A process for producing magnetic iron oxide particles for magnetic recording comprising modifying the magnetic iron oxide particles having an improved saturation magnetization obtained in accordance with claim 9 with a cobalt compound or both a cobalt compound and a ferrous compound.

17. A process for producing magnetic ion oxide particles for magnetic recording comprising the steps of heat-treating a starting material, magnetite particles, in the presence of a zinc component or both a zinc component and a silicon component at a temperature of 450° to 700° C. in an inert atmosphere and then treating by wet oxidation and/or dry oxidation, thereby doping said particles with zinc ions resulting in berthollide particles having an improved saturation magnetization, a proportion of said zinc ions being 2 to 9 at. % by weight relative to the total amount of iron ions.

18. The process according to claim 17 where said heat-treatment in the presence of a zinc component is performed at a temperature of 450° to 600° C.

19. The process according to claim 17 where said heat-treatment in the presence of both a zinc component and a silicon component is performed at a temperature of 450° to 700° C.

20. A process for producing magnetic iron oxide particles for magnetic recording comprising modifying the magnetic iron oxide particles having an improved saturation magnetization obtained in accordance with claim 17 with a cobalt compound or both a cobalt compound and a ferrous compound.

21. A process for producing magnetic iron oxide particles for magnetic recording comprising the steps of heat-treating a starting material, magnetite particles, in the presence of a zinc component or both a zinc component and a silicon component at a temperature of 450° to 700° C. in an inert atmosphere, then treating by wet oxidation and or dry oxidation and, thereafter, immersing said particles in an acidic solution or an alkaline solution, thereby doping said particles with zinc ions resulting in berthollide particles having an improved saturation magnetization, a proportion of said zinc ions being 2 to 9 at. % by weight relative to the total amount of iron ions.

22. The process according to claim 21 where said heat-treatment in the presence of a zinc component is performed at a temperature of 450° to 600° C.

23. The process according to claim 21 where said heat-treatment in the presence of both a zinc component and a silicon component is performed at a temperature of 450° to 700° C.

24. A process for producing magnetic iron oxide particles for magnetic recording comprising modifying the magnetic iron oxide particles having an improved saturation magnetization obtained in accordance with claim 21 with a cobalt compound or both a cobalt compound and a ferrous compound.

* * * * *